US000001297H

United States Statutory Invention Registration [19]

[11] Reg. Number: H1297

Partin et al.

[43] Published: Apr. 5, 1994

[54] DETECTION DEVICE FOR HAZARDOUS MATERIALS

[75] Inventors: Judy K. Partin; Alan E. Grey, both of Idaho Falls, Id.

[73] Assignee: The United States of America as represented by the Department of Energy, Washington, D.C.

[21] Appl. No.: 504,218

[22] Filed: Apr. 4, 1990

[51] Int. Cl.[5] ..... G01N 21/00

[52] U.S. Cl. ..... 422/82.05; 422/82.06; 422/82.07

[58] Field of Search ..... 422/82.05, 82.06, 82.07, 422/82.08, 82.09, 86

[56] References Cited

U.S. PATENT DOCUMENTS

| | | | |
|---|---|---|---|
| Re. 33,064 | 9/1989 | Carter et al. | 422/82.07 X |
| 3,998,591 | 12/1976 | Eckfeldt | 422/86 X |
| 4,050,895 | 9/1977 | Hardy et al. | 422/98 X |
| 4,264,209 | 4/1981 | Brewster | 356/437 X |
| 4,513,087 | 4/1985 | Guiliani et al. | 436/111 X |
| 4,548,907 | 10/1985 | Seitz et al. | 436/178 X |
| 4,577,109 | 3/1986 | Hirschfeld | 436/172 X |
| 4,582,809 | 4/1986 | Block et al. | 422/57 X |
| 4,775,633 | 10/1988 | Rounbehler | 436/111 X |
| 4,880,752 | 11/1989 | Keck et al. | 422/82.09 X |
| 4,925,268 | 5/1990 | Iyer et al. | 422/82.06 X |
| 4,952,513 | 8/1990 | Koocher | 436/36 |

*Primary Examiner*—Robert L. Stoll
*Assistant Examiner*—Joseph D. Anthony
*Attorney, Agent, or Firm*—Thomas G. Anderson; James W. Weinberger; William R. Moser

[57] ABSTRACT

A detection device that is activated by the interaction of a hazardous chemical with a coating interactive with said chemical on an optical fiber thereby reducing the amount of light passing through the fiber to a light detector. A combination of optical filters separates the light into a signal beam and a reference beam which after detection, appropriate amplification, and comparison with preset internal signals, activates an alarm means if a predetermined level of contaminant is observed.

7 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DETECTION DEVICE FOR HAZARDOUS MATERIALS

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

BACKGROUND OF THE INVENTION

This invention relates to a device that can be worn or carried by an individual, and is capable of detecting air-borne hazardous chemicals such as hydrazine, at extremely low concentrations.

Hydrazine is a colorless, fuming hygroscopic liquid that is miscible with alcohol and water. A strong reducing agent, it is highly toxic by ingestion, inhalation and skin absorption and is a strong irritant to skin and eyes. In addition to being a carcinogen, it poses a severe explosion hazard when exposed to heat or flame or by reaction with oxidizing materials. For these reasons its recommended tolerance in air is on the order of 100 parts per billion (ppb).

Hydrazine has a multitude of uses, most notably in rocket fuels, agricultural chemicals, drugs, metal and glass plating, fuel cells, solder flux, explosives, photographic developers and as a corrosion inhibitor in water-cooled nuclear power plants. Because of this wide range of product uses and its deadly nature, it is of paramount importance to carefully monitor for the presence of hydrazine in those places where hydrazine may be present in the air due to leakage, spillage, or other means.

SUMMARY OF THE INVENTION

The present invention is a detection device utilizing fiber optics as the detecting medium. By coating a fiber optical fiber with an aldehyde susceptible to a color change when exposed to hydrazine, light transmission and/or absorbance through the fiber is altered. Light from a broadband source, such as a tungsten-halogen lamp, is passed through a focusing lens onto the first end of the optical fiber. Light emitted from the second end is projected onto a combination of filters which permits only light of a desired frequency to pass. The device is interconnected to a sensing diode such that any variation in light transmission, above or below a pre-determined threshold level, will activate an audible and/or visible alarm. The apparatus may be configured into a package approximately the size of a pocket calculator and can be operated from a small battery pack.

Detection of other hazardous materials may be effected by applying different coatings to the fiber susceptible to a color change when exposed to the material to be detected. The filter system and sensing diode are selected depending upon the particular light frequency necessary for that detection.

The reaction set forth below is applicable for the three types of hydrazine commonly used as rocket fuels: hydrazine ($H_2NNH_2$), methyl hydrazine ($CH_2NHNH_2$) and unsymmetrical dimethyl hydrazine ($(CH_3)_2NNH_2$). Each of these will react with an aldehyde coating on an optical fiber and produce a color change in the coating. The degree of color change and rate of reaction will usually vary with different aldehydes. After testing a number of different aldehydes, the optical coating selected for use on the sensor of the present invention was 4-nitrobenzaldehyde ($NO_2C_6H_4CHO$). This particular aldehyde gave the fastest response and most distinctive color change (colorless to brown) when in the presence of hydrazine. Using methylhydrazine as the perceived hazardous chemical, the applicable reaction is:

$$NO_2C_6H_4CHO + CH_3NHNH_2 \rightarrow NO_2C_6H_4CH{=}NNHCH_3 + H_2O \quad (1)$$

To secure the aldehyde to the optical fiber, a solution of 1% polyethylene oxide by weight in 99% methylene chloride ($CH_2Cl_2$) by weight was prepared. To this solution was added 4-nitrobenzaldehyde to prepare a $1X10^{-4}$ molar solution. Drawing the optical fiber through this solution deposited a film having an approximate thickness of 1 micron onto the optical fiber.

The refractive index of the polymer was determined from the literature to about 1.454 (slightly lower than that of the quartz fiber index of 1.46), which permitted the evanescent lightwave to interrogate the aldehyde molecules on the surface as they reacted with the hydrazine vapors in the air. If the refractive index of the coating is less than that of the fiber, internal reflectance occurs and most of the light remains within the fiber core. That portion of the internal light transmitted by the fiber which penetrates into and is absorbed by the fiber coating is referred to as the evanescent wave.

As the reaction between the aldehyde in the coating and the airborne hydrazine occurs, a portion of the light is absorbed by the coating, reducing the amount of light transmitted by the fiber. The change in light intensity can be measured by the detecting diode. When the detecting diode measures a decrease in light intensity greater than that predicted based upon a control situation, the detecting diode activates a visual and/or an audible alarm to alert an operator that hydrazine is present in the air in an undesirable concentration.

The experimental apparatus utilized herein comprised a 58 liter test chamber containing a heat plate and fan for instantaneous vaporization and circulation of the hydrazine vapors. Placing the detector containing the coated optical fiber in the test chamber allowed detection of hydrazine down to about 12 ppm in an approximate 5-minute time period. Further refinements are expected to lower the detection level to the low parts-per-billion range, at or below the 100 ppb tolerance level. The sensitivity of the coating can be increased by increasing the concentration of aldehyde on the fiber by increasing the surface area of the optical fiber, or by decreasing the coating thickness.

DETAILED DESCRIPTION OF THE INVENTION

Figure 1:
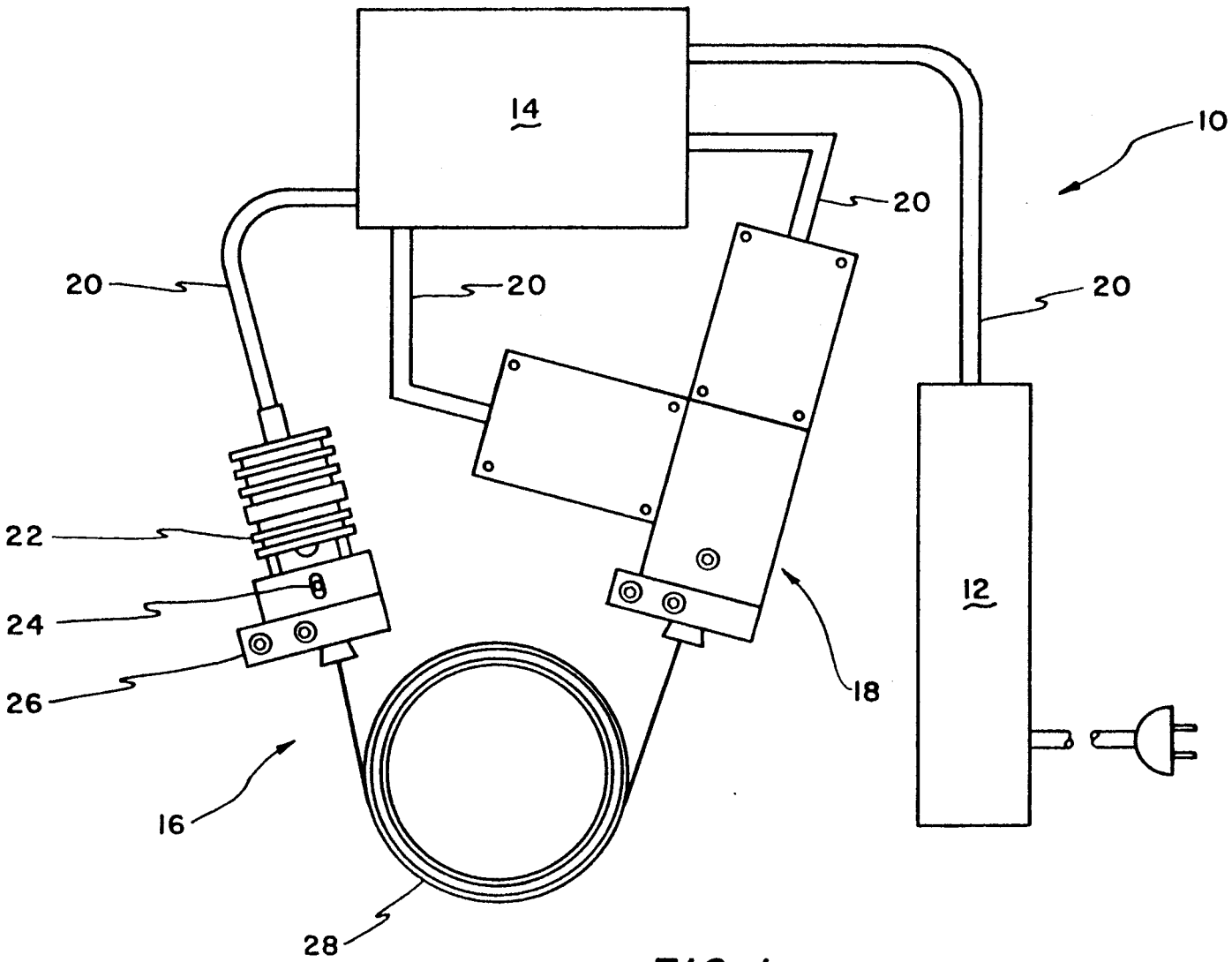
FIG. 1 schematically illustrates the major components of the present invention.

FIG. 1 illustrates diagrammatically the major components of the hydrazine detection device 10 of the present invention. Power supply 12 provides +15, −15 and +4.8 volts to electronic circuit board 14 which in turn powers the sensor assembly 16 and detector assembly 18 by means of cables 20. The power supply input can be optionally energized by 110 volts AC power 21. Sensor assembly 16 is comprised of lamp housing 22, lens focus means 24, a first X-Y micrometer stage 26 and optical fiber 28 which is chemically treated with an aldehyde coating adapted to react with hydrazine. The reaction at the surface of the optical fiber causes light transmitted through the fiber to be absorbed into the coating, such that less light is available to enter and be detected by the detector assembly 18.

Figure 2:
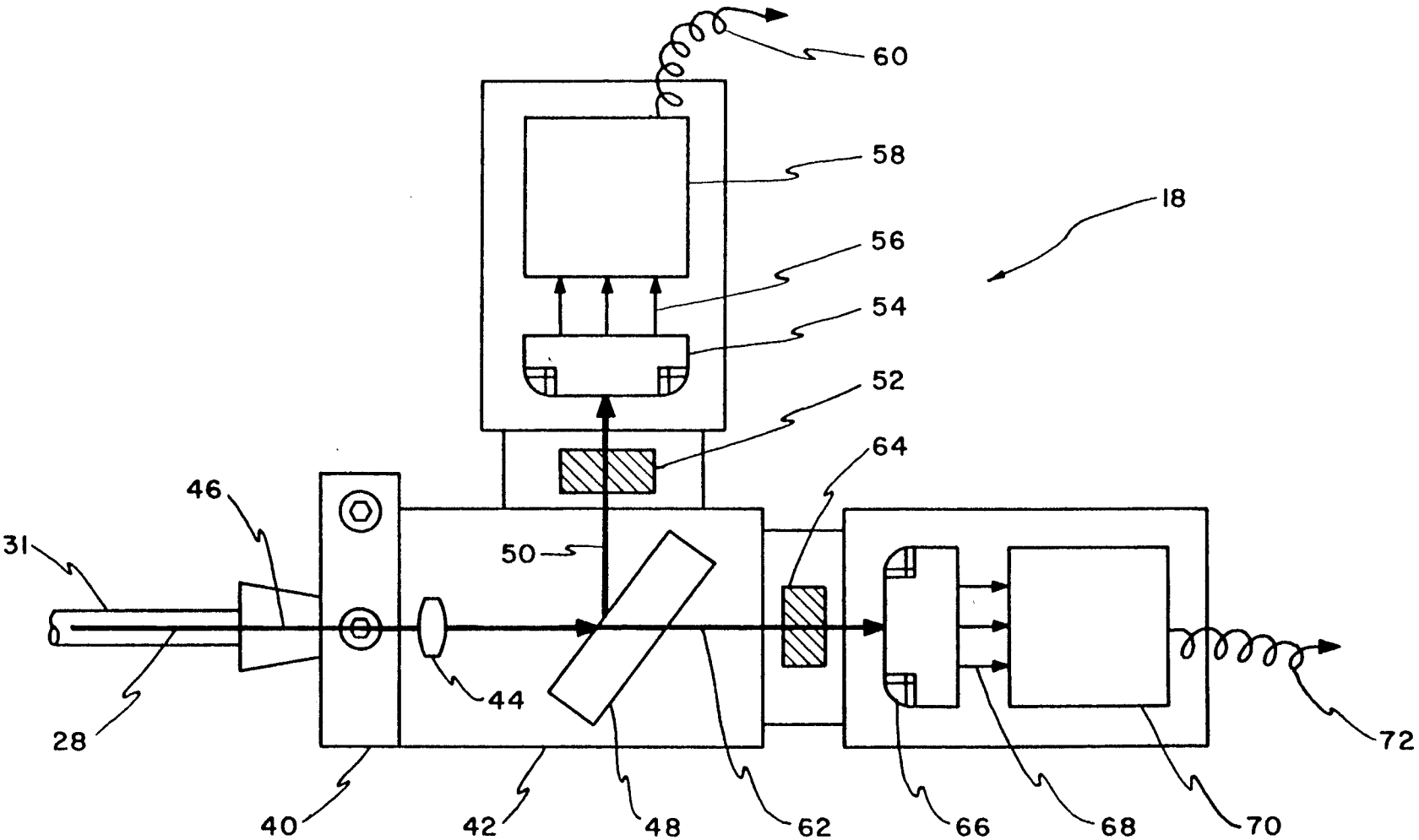
FIG. 2 illustrates the hydrazine detector portion of the present invention.

The detector assembly 18 is illustrated in greater detail in FIG. 2. Optic fiber 28 comprises a conventional quartz fiber having a coating 31 of an aldehyde, such as 4-nitrobenzaldehyde. Fiber 28 is attached to a second X-Y micrometer stage 40 which fine tunes the alignment of the light beam emitted from fiber 2 into the mirror housing 42 and onto focusing lens 44. The micrometer stages 26, 40 are conventional apparatus' well-known to those skilled in this art. For example, a micrometer stage marketed by The Newport Co. under the name Fiberoptic Positioner has been found useful in this embodiment. Light beam 46 passes through the focusing lens 44 and thereafter impinges on a beam splitter in the form of a conventional dichroic mirror 48, whereupon a first light beam signal portion 50 is separated from a second light beam signal portion and directed through a filter 52 onto signal photodiode 54. The electrical output from diode 54 is then transmitted through conductors 56 to signal amplifier 58. The output from amplifier 58 is transmitted by conductor 60 to the electronic circuit board 14 (FIG. 1) for further processing.

The second light beam signal portion (or reference portion) 62 of beam 44 is directed through filter 64 to reference photodiode 66. The electrical output of diode 66 is transmitted through conductors 68 to reference amplifier 70. The amplified reference signal is transmitted through conductor 72 to electronic circuit board 14 (FIG. 1) similar to the amplified signal portion 60 described above.

It is to be understood that the aldehyde coating applied to the optical fiber can take many forms based upon the particular circumstances, and that the coating thickness may vary. While it is contemplated that the thicness will be on the order of about 1 micron, it is expected that greater sensitivity of the device can be obtained with a thinner coating. It should also be appreciated that the filters 52, 64 are conventional state-of-the-art filters selected such that particular wavelengths of light are emitted therethrough, which are thereafter assimilated at circuit board 14. For example, Applicants have found that a 360 nanometer (nm) band pass filter 52 and a 700 nm band pass filter 64 produces exemplary results in the apparatus of the present invention.

Operation of an experimental hydrazine detection device 10 of the present invention is illustrated by reference to the schematic diagramof FIG. 3. Power supply 12 distributes +15, −15 and 4.8 volts DC to the circuit board 14, which in turn provides 4.8 volts to sensor assembly 16 through cables 20. The assembly 16 comprises light source 80, such as a tungsten-halogen lamp, which directs light 84 onto first lens 82. The light beam 83 exiting the lens 82 is focused by lens 82 through the first X-Y micrometer stage 26 into the coated optical fiber 28. The sensor assembly 16 is placed in an airtight container or test chamber 85 for testing. A predetermined amount of hydrazine (for example, an amount sufficient to result in a final concentration of 25 ppm or 60 ppm within container 85) is introduced into the test chamber 85. The hydrazine within the test chamber comes into contact with and reacts with the aldehyde coating around the optical fiber 28. A representative reaction of the airborne hydrazine with the aldehyde coating is illustrated in equation (1) above, and results in absorption of light in the aldehyde coating from fiber 28, color from essentially colorless (therefore little or no absorbance of light) to brown. The brown coating reduces the of light transmitted through the optical fiber 28 to the detector 18.

The light from fiber 28 passes through the second X-Y micrometer stage 40 and is focused by lens 44, with beam 46 being split at dichroic mirror 48. The reference portion 62 of beam 44 is a constant against which the signal portion 50 of beam 44 is measured. Reference beam 62 is directed through a 700 nm band pass filter 64 and thence onto reference photodiode 66. The output signal is conducted to reference amplifier 70. The signal portion 50 of beam 44 is directed through a 360 nm filter 52, the wavelength chosen to maximize the amount of light absorbed by the aldehyde coating.

As the "browning" reaction between the aldehyde coating and hydrazine occurs, absorbance of light by the coating increases and less light is transmitted through cable 28 to the mirror 48 and signal photodiode 54. The reduced signal voltage is transmitted through conductor 60 to alarm means 88, including detector comparator 86, which is programmed to sense a change in the difference between the variable signal voltage entering via conductor 60 and an internally adjustable reference signal.

The detector comparator 86 is interconnected with a low-light comparator 90 via conductor 92 and an appropriate resistor 94. The signal comparison between the comparators 86, 90 is utilized to eliminate a spurious alarm due to low light level entering the device at 46, as opposed to low detector level signal at 54 resulting from the presence of hydrazine.

A third low-voltage comparator 96 receives input from the 4.8 volt DC power supply via cable 20. Comparator 96 senses a difference between the 4.8 volt signal voltage and an internally adjustable preset voltage, which in this case would normally be 4.8 volts. A perceived voltage at 96 (i.e. less than 4.8 volts) reduces the intensity of light 80, thereby reducing the intensity of light transmitted through detector assembly 18 to photodiode 54. Therefore, while the comparators 86 and 90 may indicate low light received (indicating the presence of hydrazine) such signals may be ignored if the comparator 96 indicates inadequate voltage, and therefore prevents accepting the results perceived at comparators 86, 90.

The device disclosed above can be modified to provide that the intensity of light beam 44 is immaterial, such that the comparison is made between the actual voltage and the actual intensity of beam 44.

In each case when the variable signal level monitored by one of comparators 86, 90, 96 differs from the internally preset signal level, the resultant output activates alarm means, such as detector light emitting diode (LED) alarm 100, low-liqht LED alarm 102 or low-voltage alarm LED 104. An audible alarm may also be incorporated with any of the comparators.

The low-light comparator 90 can be internally adjusted to detect an increase in light as well as the aforementioned reduction in light. In the event of, for example, a broken seal in the mirror housing 40 allowing unwanted light into the housing, such light would adversely affect calibration and should be detected. Additionally, changing the alignment of lens 46 can cause an increase in light affectinq calibration of the device.

In addition to the visual LED alarms, the signal from each comparator can be connected to a quad bilateral switch/timer 106 that activates piezoelectric buzzer 108 to warn an operator of other than optimal conditions. Such conditions (other than the expected detection of hydrazine at the predetermined level) inoperative sensor preventing operation as designed (such as fade-out of the light signal) or breach of the sensor container due to dropping, or inadequate voltage (dead batteries).

Figure 4:
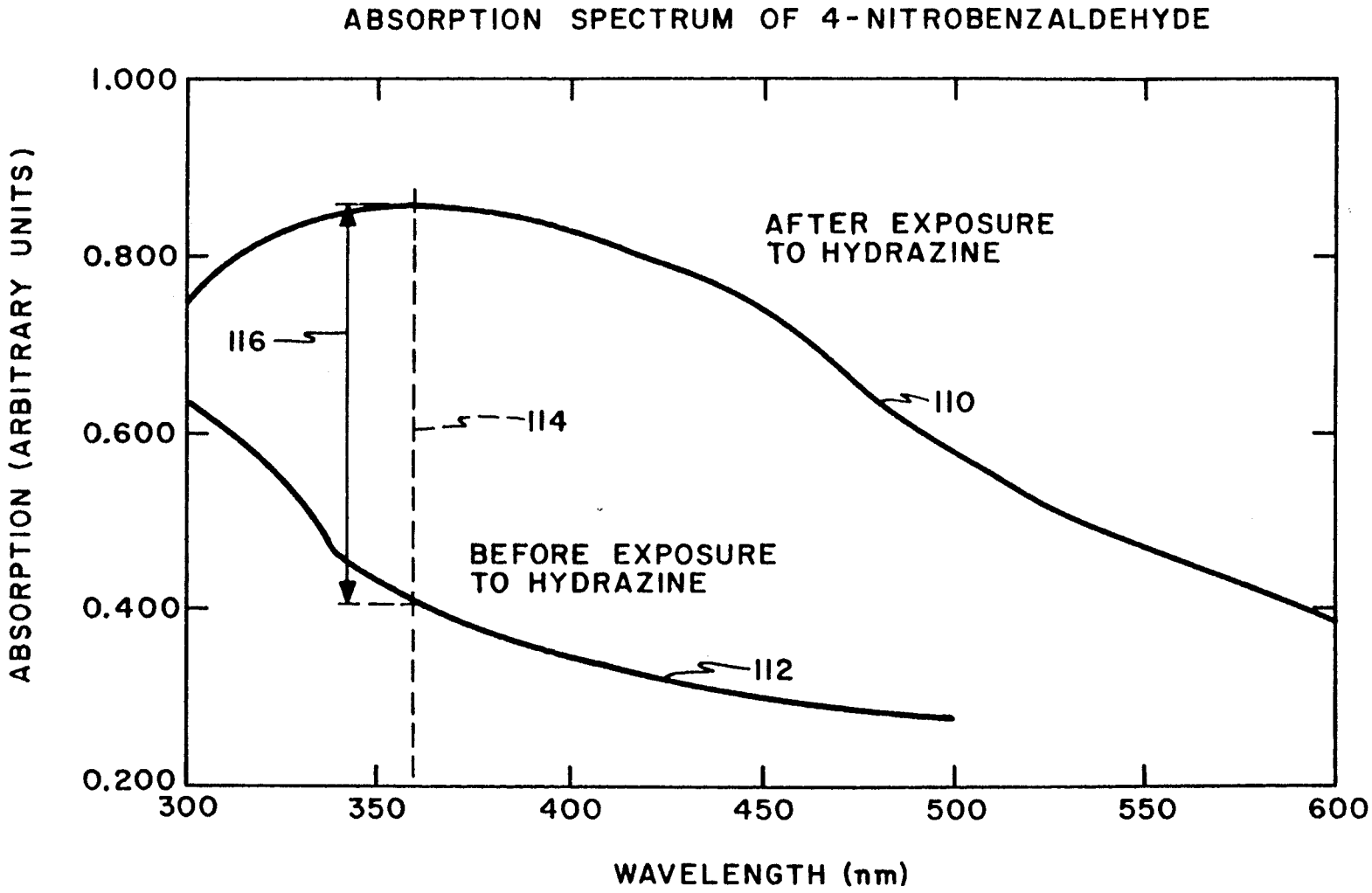
FIG. 4 is a graph of absorption of 4-nitrobenzaldehyde versus illumination wavelength before and after exposure to hydrazine.

FIG. 4 illustrates the effect of exposure of 4-nitrobenzaldehyde (the preferred fiber coating) to hydrazine. A coating of 4-nitrobenzaldehyde entrapped in polyethylene oxide polymer was exposed to hydrazine under ambient conditions. The relative values of light absorption of 4-nitrobenzaldehyde before (curve 112) and after (curve 110) exposure to hydrazine, were obtained to determine that wavelength of light where maximum absorbance occurred. The difference between the two curves maximizes at 114, representing the absorbance occurring at a wavelength of about 360 nm. The band pass value of the detecting filter 52 was therefore set at this wavelength. Selection of this wavelength can be seen to maximize detector sensitivity between signals as shown at 116.

Figure 5:
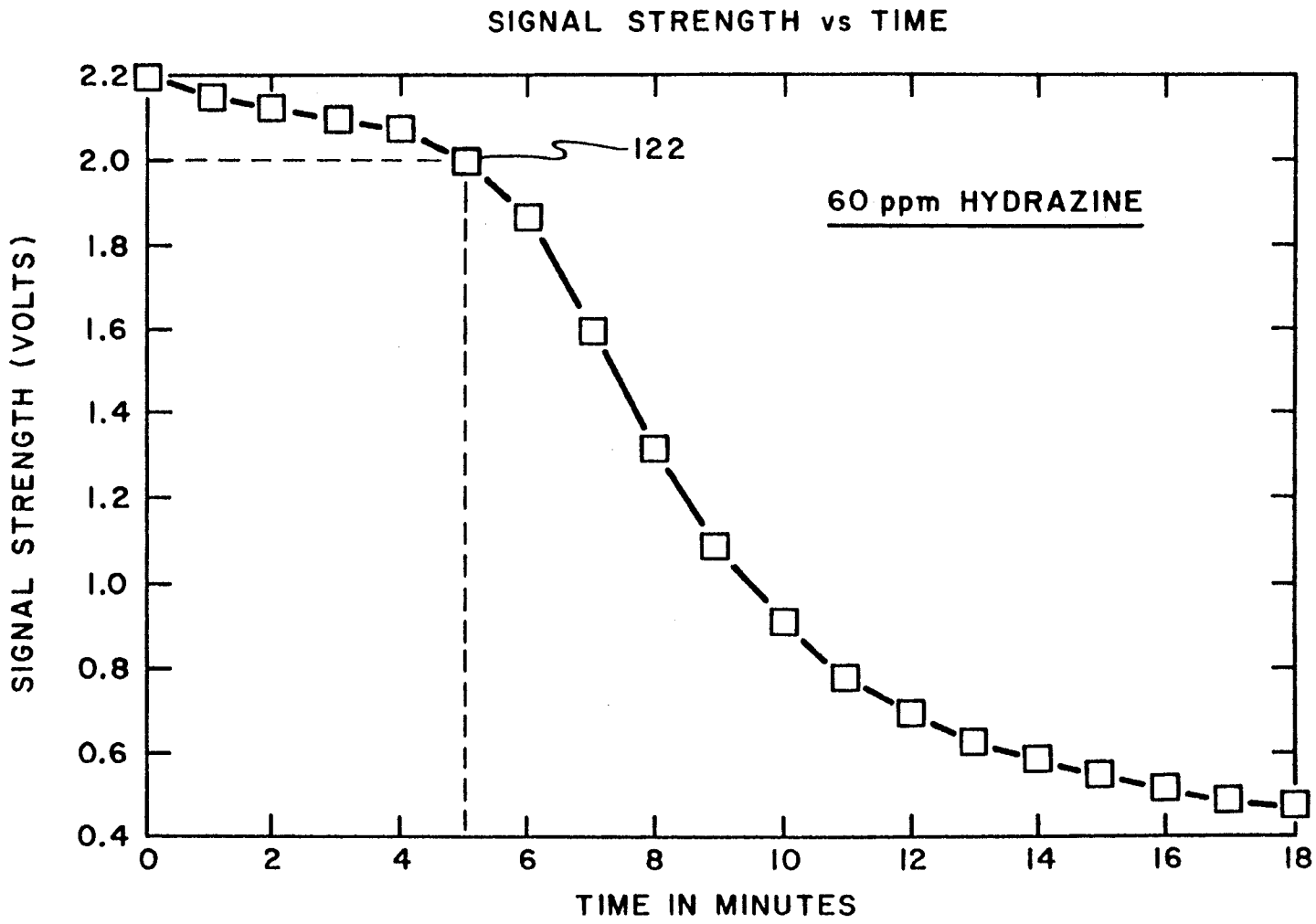
FIG. 5 is a graphic illustration of detector output signal intensity versus time at 60 ppm hydrazine.

Signal strength measured by photodiode 54 versus time of exposure of cable 28 within test chamber 85 to a 60 ppm concentration of hydrazine is illustrated in FIG. 5. A 10% drop in voltage (from 2.2 to 2.0 volts) occurs at the knee 122 after an exposure time of 5 minutes at this concentration.

Figure 3:
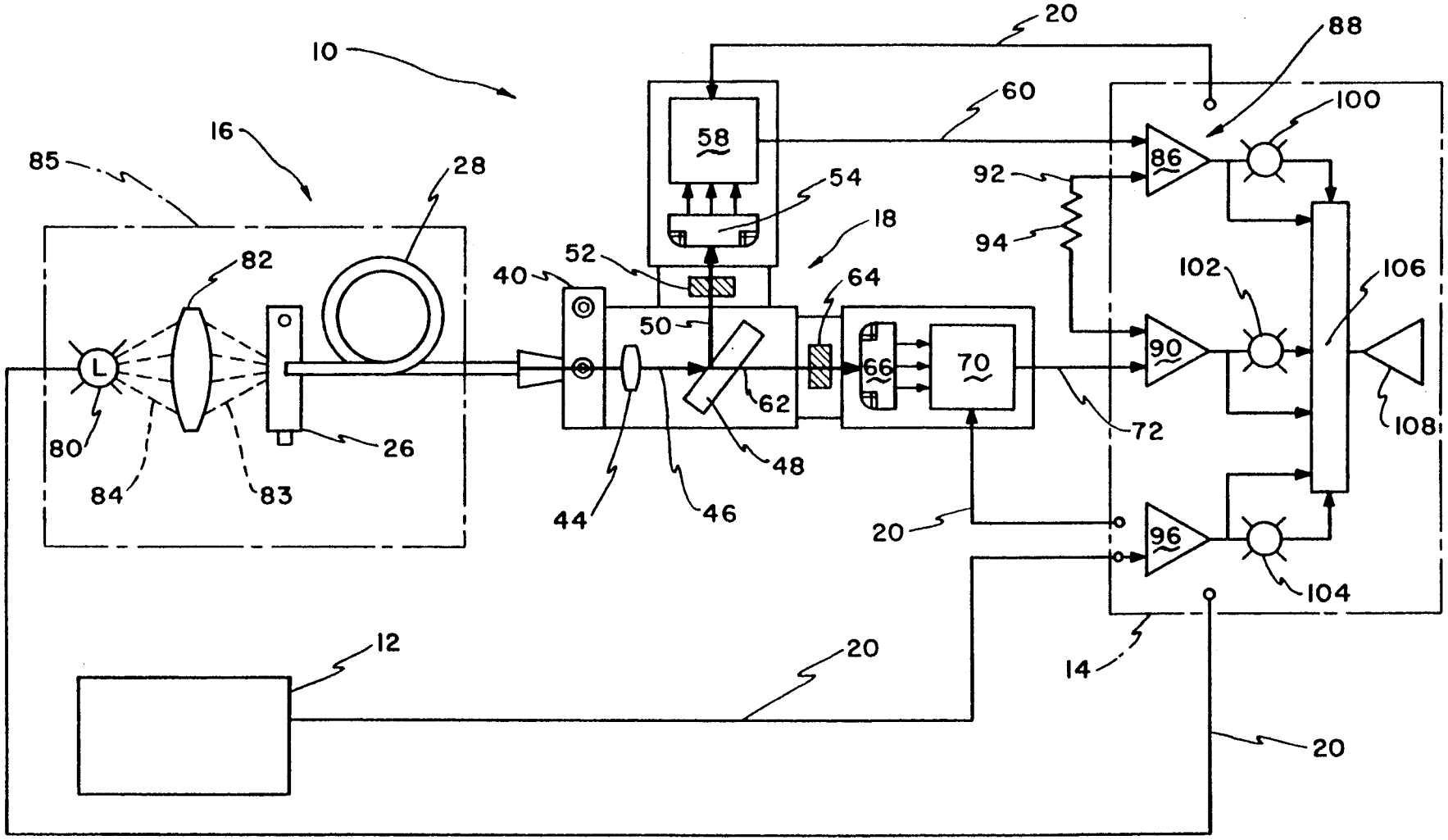
FIG. 3 is a schematic diagram illustrating the electrical, mechanical and optical apparatus of the present invention.
Figure 6:
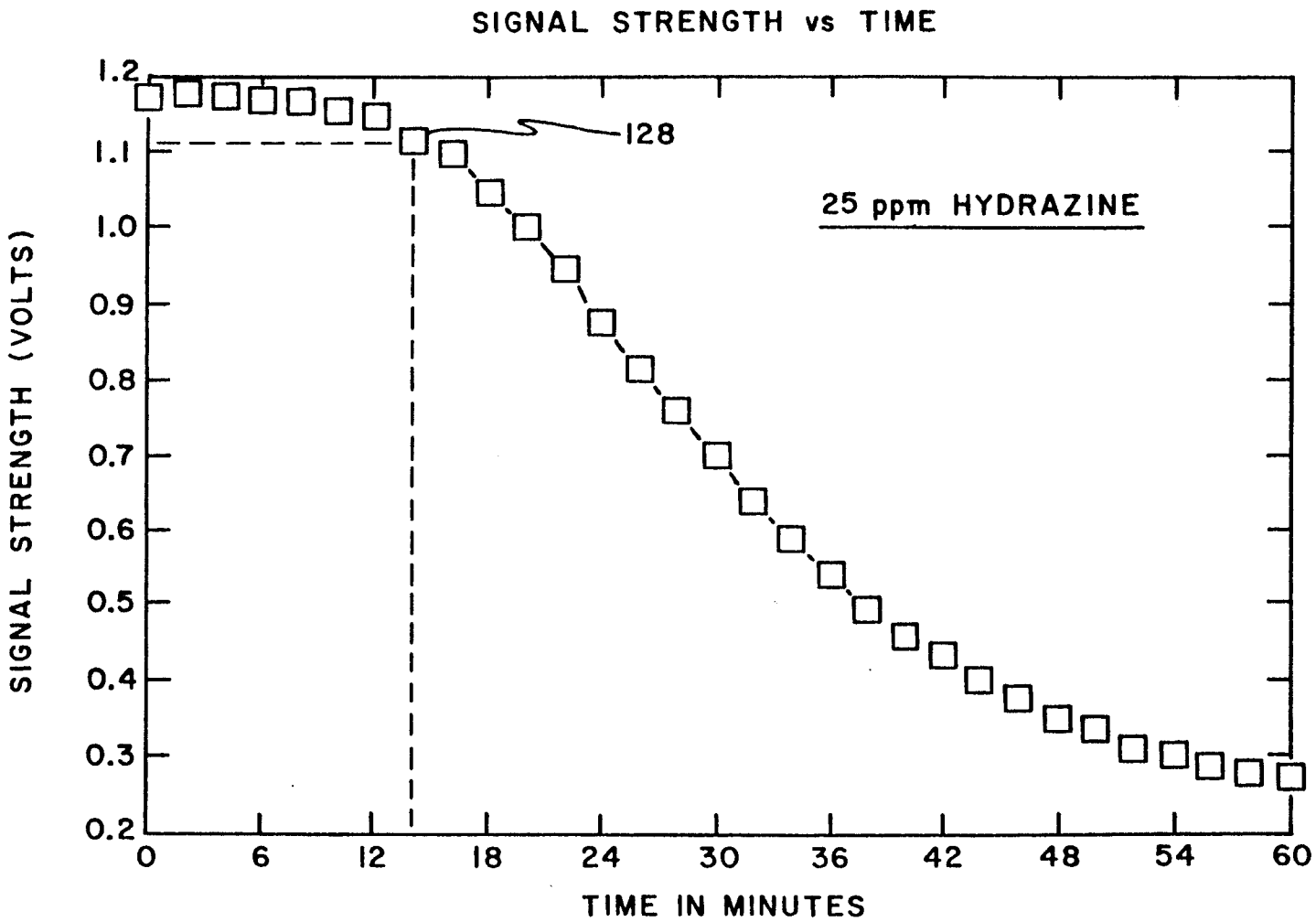
FIG. 6 is a graphic illustration of detector output signal strength versus time at 25 ppm hydrazine.

The effect of a reduced concentration (25 ppm) of hydrazine in the experimental apparatus of FIG. 3 is illustrated in FIG. 6, wherein the knee of the curve occurs at point 128, representing an approximate 10% reduction in signal strength. Such reduction occurs after an exposure time about 14 minutes. Applicants have determined that concentrations as low as 12 ppm are detectable in an approximate 5-minute exposure time using the apparatus of FIG. 3. It is anticipated that exposure times significantly less than 5 minutes can be achieved with process optimization. It is therefore anticipated that further refinements can reduce the detection level to the parts-per-billion range for reasonable exposure times. For example, by increasing the concentration of aldehyde in the coating, or by increasing the diameter of the optical fiber (thereby increasing the surface area), or by decreasing the thickness of the coating, the sensitivity of the process described herein can be increased.

While the invention has been described herein with particular reference to a coating of 4-nitrobenzaldehyde as the preferred aldehyde for detecting hydrazine, it is to be appreciated that other aldehyde coatings are operative in the practice of this invention. For instance, p-bromobenzaldehyde and salicylaldehyde are acceptable coating constituents.

While the apparatus and process of the present invention have been described and illustrated herein with reference to hydrazine detection, it is to be understood that the process is equally susceptible for the detection of other hazardous chemicals. So long as a color-sensitive coating reactive with the chemical to be detected can be applied to an optic fiber, such process can be utilized. Therefore, a coating of phenoxazine can be used to detect ozone or nitrogen dioxide. In the presence of ozone, the coating turns a dull brown color and with nitrogen dioxide a red-orange color. Similarly, a coating of tetracyanoethylene in the presence of light aromatic hydrocarbons changes color—a bright yellow in the presence of benzene, orange in the presence of toluene and red in the presence of m-xylene. In its broadest embodiment, the present invention is the application of a coating to an optical fiber, the coating being chosen to interact with an airborne hazardous chemical. The interaction involves a color change of the coating causing a decrease in the amount of light transmitted through the fiber, which can be quantified with reference to a reference light source.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A hydrazine detection device comprising:

a. a power supply interconnected to a light source;

b. sensor means interconnected with the light source and having an optical fiber coated with a material comprising polyethylene oxide and 4-nitrobenzaldehyde capable of reacting to the presence of hydrazine;

c. light detecting means; and d. alarm means to indicate a change in light transmitted by the optical fiber responsive to the presence of a predetermined level of hydrazine.

2. The device as recited in claim 1, wherein the refractive index of the material coating the fiber optic cable is substantially similar to the refractive index of the cable.

3. The device as recited in claim 1, wherein the optical fiber is coated to a depth of less than one micron.

4. The device as recited in claim 1, wherein the material comprises 1% polyethylene oxide by weight and 99% methylene chloride by weight to which is added 4-nitrobenzaldehyde to make a $1\times10^{-4}$ molar solution.

5. The device as recited in claim 1, wherein the sensor means further comprises:

a. a tungsten-halogen light;

b. a focusing lens; and c. a first X-Y micrometer stage wherein the tungsten-halogen light is focused by the focusing lens into a first end of said optical fiber.

6. The device as recited in claim 5, wherein the light detecting means further comprises:

a. a housing having:

i. a dichroic mirror;

ii. a focusing lens;

iii. a second X-Y micrometer stage; and iv. a first and second light filter;

b. a signal photodiode interconnected with a signal amplifier; and c. a reference photodiode interconnected with a reference amplifier.

7. The device as recited in claim 6, wherein the first light filter is a beam-pass filter of about 360 nanometer wavelength and the second light filter is a beam-pass filter of about 700 nanometer wavelength.

* * * * *